United States Patent
Ninomiya et al.

(10) Patent No.: US 6,174,949 B1
(45) Date of Patent: Jan. 16, 2001

(54) RESIN COMPOSITION, PROCESS FOR PREPARING THE SAME, AND LAMINATE CONTAINING LAYER OF SAID RESIN COMPOSITION

(75) Inventors: Kenji Ninomiya, Ibaraki; Makoto Kunieda, Kurashiki, both of (JP)

(73) Assignee: Nippon Gohsei Kagaku Kogyo Kabushiki Kaisha, Osaka (JP)

( * ) Notice: Under 35 U.S.C. 154(b), the term of this patent shall be extended for 0 days.

(21) Appl. No.: 09/269,222

(22) PCT Filed: Jul. 24, 1998

(86) PCT No.: PCT/JP98/03310

§ 371 Date: Mar. 23, 1999

§ 102(e) Date: Mar. 23, 1999

(87) PCT Pub. No.: WO99/05213

PCT Pub. Date: Feb. 4, 1999

(30) Foreign Application Priority Data

| Jul. 25, 1997 | (JP) | 9-215694 |
| Jul. 28, 1997 | (JP) | 9-218052 |
| Oct. 9, 1997 | (JP) | 9-293415 |
| Oct. 9, 1997 | (JP) | 9-293416 |
| Oct. 9, 1997 | (JP) | 9-293417 |
| Apr. 8, 1998 | (JP) | 10-114184 |
| Apr. 8, 1998 | (JP) | 10-114185 |
| Apr. 8, 1998 | (JP) | 10-114186 |

(51) Int. Cl.$^7$ ................................................. C08K 3/38
(52) U.S. Cl. ................................................. 524/404
(58) Field of Search .................................... 524/404

(56) References Cited

U.S. PATENT DOCUMENTS 5,895,797 * 4/1999 Hayashihara ............................ 525/95

FOREIGN PATENT DOCUMENTS

| 57-59940 | 4/1982 | (JP) . |
| 56-41204 | 4/1984 | (JP) . |
| 62-143954 | 6/1987 | (JP) . |
| 63-72544 | 4/1988 | (JP) . |

* cited by examiner

Primary Examiner—Paul R. Michl
(74) Attorney, Agent, or Firm—Armstrong, Westerman, Hattori, McLeland & Naughton

(57) ABSTRACT

A resin composition is provided which comprises (A) a saponified ethylene-vinyl acetate copolymer (referred to as EVOH for short) with an ethylene content of 20 to 60 mole percent and a saponification degree of not less than 90 mole percent, and contains therein (B) a boron compound as an essential component, (C) acetic acid as an optional component, and at least one compound selected from among (D) an acetic acid salt and (E) a phosphoric acid compound as an essential component, the contents of the respective additive components per 100 parts by weight of EVOH (A) being as follows:

boron compound (B): 0.001 to 1 part by weight on the boron basis;
acetic acid (C): 0 to 0.05 part by weight;
acetic acid salt (D): 0.001 to 0.05 part by weight on the metal basis; and
phosphoric acid compound (E): 0.0005 to 0.05 part by weight on the phosphate radical basis.

This resin composition is typically produced by bringing EVOH (A) with a water content of 20 to 80% by weight into contact with an aqueous solution containing the respective additive components mentioned above and then subjecting the thus-treated EVOH to fluidized state drying and then to stationary state drying.

6 Claims, No Drawings

TECHNICAL FIELD

The present invention relates to a resin composition based on a saponified ethylene-vinyl acetate copolymer (namely an ethylene-vinyl alcohol copolymer; hereinafter referred to as EVOH for short) More particularly, it relates to a resin composition having a remarkable aptitude for allowing long-run operations and capable of giving melt-molded articles having no or only a limited number of fish eyes or striate, hence having a good appearance as well as laminates excellent in interlaminar adhesion. It also relates to a process for producing said resin composition and to a laminate comprising a layer composed of said resin composition.

BACKGROUND ART

Generally, EVOH is very excellent in such properties as transparency, gas barrier property, aroma-retaining property, solvent resistance and oil resistance. Owing to these characteristics, EVOH is molded into films, sheets, or containers such as bottles, for use as packaging materials for foods, drugs, industrial chemicals, agrochemicals and so forth.

In molding EVOH, melt molding is generally performed. By said melt molding, EVOH is processed into various forms for practical use, such as films, sheets, bottles, cups, tubes and pipes. The processability (moldability) of EVOH is therefore very important. In many instances, EVOH is coextruded with a substrate material such as a polyolefin resin via an adhesive layer into laminates so that EVOH can be provided with mechanical strength, moisture resistance and heat-sealability, among others. In those cases, the interlaminar adhesion of the laminates is also important.

Thus, for producing practical products utilizing the above-mentioned characteristic features of EVOH, EVOH is required to be fully satisfactory from the viewpoints of the possibility of long-run melt molding operations, the appearance of moldings (absence of fish eyes or striate) and the interlaminar adhesion. Since, however, EVOH is inferior in melt moldability to general purpose resins for molding, it is necessary to take measures to improve the moldability.

The following publications describe the treatment of EVOH with a boron compound or the incorporation of a boron compound in EVOH.
(1) Japanese Patent Publication S49-20615 discloses a process for producing EVOH having excellent heat stability and mechanical properties which comprises treating EVOH with a boron compound.
(2) Japanese Kokai Tokkyo Koho S59-192564 discloses a gas barrier laminate comprising a layer of EVOH treated with a boron compound as overlaid, on one side or both sides thereof, with a polyolefin layer or layers via an adhesive layer composed of a carboxyl- or hydroxyl-containing modified polyolefin. This laminate shows improved interlaminar adhesion. The boron content of the boron compound-treated EVOH is 0.002 to 0.2% by weight, preferably 0.005 to 0.1% by weight.
(3) Japanese Kokai Tokkyo Koho S55-12108, the applicant of which is the present applicant, discloses the melt molding of a composition comprising a melt-moldable vinyl alcohol copolymer (inclusive of EVOH) supplemented with 0.02 to 2% by weight of a rapid reaction type melt tension improving agent (inclusive of boric acid and boron).
(4) Japanese Kokai Tokkyo Koho S57-34148, the applicant of which is also the present applicant, discloses a resin composition limited in draw down and excellent in shock resistance which comprises 100 parts by weight of EVOH, 2 to 15 parts by weight of an alcohol-based plasticizer and 0.05 to 3 parts by weight of boric acid or borax.

The following publications describe the treatment of EVOH with a phosphoric acid compound or the incorporation of a phosphoric acid compound in EVOH.
(1) Japanese Kokai Tokkyo Koho S52-954 discloses a composition comprising a polyvinyl alcohol polymer (inclusive of EVOH) with 0.001 to 1% by weight of a partial alkali metal salt of a polybasic acid having a specific pKa value (e.g. potassium dihydrogen citrate, potassium dihydrogen phosphate, sodium dihydrogen phosphate, sodium hydrogen tartrate) as added thereto. The purpose of the incorporation of a partial alkali metal salt of a polybasic acid is to improve the heat stability and the processability in thermal molding.
(2) Japanese Kokai Tokkyo Koho S64-66262 discloses a composition comprising EVOH, 0.0005 to 0.05% by weight (calculated as metal) of a salt of a metal of group II of the periodic table (e.g. calcium acetate, magnesium acetate), 0.0005 to 0.05% by weight of an acidic substance having a pKa of not less than 3.5 and a boiling point at ordinary pressure of not lower than 180° C. (e.g. adipic acid, benzoic acid, potassium dihydrogen phosphate, sodium dihydrogen phosphate, aspartic acid) and 0.01 to 0.2% by weight of an acidic substance having a pKa of not less than 3.5 and a boiling point at ordinary pressure of not higher than 120° C. (e.g. acetic acid, formic acid).
(3) Japanese Kokai Tokkyo Koho H02-235952 discloses an EVOH composition comprising EVOH and specified small proportions of an alkali metal acetate, acetic acid, and phosphoric acid or an alkali metal hydrogen phosphate as well as a multilayer container with said composition as the innermost layer. The purpose of incorporating these compounds is to reduce the emanation of odorous components and improve the heat stability.
(4) Japanese Kokai Tokkyo Koho S62-143954, the applicant of which is the present applicant, discloses a method of treating EVOH which comprises treating EVOH with an acid having a pKa of not more than 5.0 (e.g. acetic acid, phosphoric acid, sodium dihydrogen phosphate) and a calcium or magnesium salt of a polybasic acid having an acid group showing a pKa of not more than 3.4 (e.g. calcium dihydrogen phosphate, magnesium dihydrogen phosphate). The purpose of this treatment is to improve the heat stability during melt molding and obtain beautiful moldings free of fish eyes or the like on the occasion of molding into films, for instance.

As mentioned above, several proposals have been put forth concerning the treatment of EVOH with a boron compound or the incorporation of a boron compound in EVOH. Concerning the treatment of EVOH with a phosphoric acid compound or the incorporation of a phosphoric acid compound in EVOH, too, several proposals have been announced.

However, the requirements imposed on the performance characteristics of EVOH in relation to the moldability and quality thereof have recently become much more severe than before and the methods disclosed in the above-cited publications can no longer satisfactorily meet such severe requirements. For instance, according to the methods described in the above-cited publications, improvements are indeed observable with respect to fish eyes or gels with a diameter of not less than 0.1 mm but, as to fish eyes or gels with a diameter of less than 0.1 mm, it is not yet achievable to reduce these to such an extent that they will not cause any trouble from the practical use viewpoint.

Under the circumstances, the present invention has for its object to provide an EVOH resin composition much more improved in melt moldability (long-run moldability), moldings' appearance (reduction in fish eyes and striate), and laminates' interlaminar adhesion as compared with the conventional compositions, and a process for producing the same, and to provide a laminate comprising a layer of said resin composition.

DISCLOSURE OF INVENTION

The resin composition of the present invention comprises (A) a saponified ethylene-vinyl acetate copolymer (referred to as EVOH for short) with an ethylene content of 20 to 60 mole percent and a saponification degree of not less than 90 mole percent, and contains therein (B) a boron compound as an essential component, (C) acetic acid as an optional component, and at least one compound selected from among (D) an acetic acid salt and (E) a phosphoric acid compound as an essential component, the contents of the respective additive components per 100 parts by weight of EVOH (A) being as follows:

boron compound (B): 0.001 to 1 part by weight on the boron basis;
acetic acid (C): 0 to 0.05 part by weight;
acetic acid salt (D): 0.001 to 0.05 part by weight on the metal basis; and
phosphoric acid compound (E): 0.0005 to 0.05 part by weight on the phosphate radical basis.

The process for producing the resin composition of the present invention comprises bringing EVOH (A) with a water content of 20 to 80% by weight into contact with an aqueous solution containing a boron compound (B) as an essential component, acetic acid (C) as an optional component, and at least one compound selected from among an acetic acid salt (D) and a phosphoric acid compound (E) as an essential component.

In that case, it is particularly preferred that the proportions of the respective additive components per 100 parts by weight of the sum total of the water contained in the aqueous solution and the water contained in EVOH (A) be set as follows:

boron compound (B): 0.001 to 0.5 part by weight;
acetic acid (C): 0.005 to 1 part by weight;
acetic acid salt (D): 0.001 to 0.5 part by weight;
phosphoric acid compound (E): 0.0001 to 0.5 part by weight.

In that case, it is also preferred that the EVOH (A) after having been brought into contact with the aqueous solution containing boron compound (B) as essential component, acetic acid (C) as optional component, and at least one compound selected from among acetic acid salt (D) and phosphoric acid compound (E) as essential component be subjected to drying in a fluidized state preceded or followed by drying in a stationary state, in particular first subjected to drying in a fluidized state and then to drying in a stationary state.

The laminate of the present invention comprises a layer composed of the above-mentioned resin composition as provided on at least one side thereof with a thermoplastic resin layer.

In the following, the present invention is illustrated in further detail.

Quantitation of the respective components

In carrying out the present invention, the above-mentioned components (B) to (E) can be quantitated in the following manner:

Component (B): The resin composition is subjected to alkali fusion and boron is quantitated by IPC emission spectrometry;
Component (C): The resin composition is extracted with hot water and acetic acid is quantitated by neutralization titration of the extract with an alkali;
Component (D): The resin composition is ashed, the ash is dissolved in aqueous hydrochloric acid and the metal is quantitated by atomic absorption spectrometry;
Component (E): The resin composition is extracted with warm diluted sulfuric acid and the phosphate radical is quantitated by absorption spectrochemical analysis (molybdenum blue reaction) (according to JIS K 0102).

EVOH (A)

EVOH (A) to be used in the present invention has an ethylene content of 20 to 60 mole percent (preferably 25 to 55 mole percent) and a degree of saponification of vinyl acetate units of not less than 90 mole percent (preferably not less than 95 mole percent). If the ethylene content is less than 20 mole percent, the gas barrier property under high humidity conditions and the melt moldability will be poor. If, conversely, the ethylene content is above 60 mole percent, no satisfactory gas barrier property cannot be obtained. When the degree of saponification is below 90 mole percent, the gas barrier property, heat stability and moisture resistance, among others, will be low, hence the objects of the present invention cannot be achieved.

From the viewpoint of moldability and mechanical physical properties of moldings, it is desirable that the melt index (MI) (210° C., load: 2160 g) of EVOH (A) be within the range of 0.5 to 100 g/10 minutes (preferably 1 to 50 g/10 minutes).

The above-mentioned EVOH (A) can be obtained by saponifying (hydrolyzing) an appropriate ethylene-vinyl acetate copolymer. The ethylene-vinyl acetate copolymer can be produced by an arbitrarily selected known method of polymerization, for example suspension polymerization, emulsion polymerization or solution polymerization. The saponification of the ethylene-vinyl acetate copolymer can be carried out by a known method.

The EVOH may be "copolymerization-modified" with a small amount of some other comonomer such as an α-olefin, an unsaturated carboxylic acid compound, an unsaturated sulfonic acid compound, (meth)acrylonitrile, (meth) acrylamide, a vinyl ether, a vinylsilane compound, vinyl chloride or styrene. It may be "post-modified" by urethanation, acetalization, cyanoethylation or the like within limits within which the essence of the present invention will not be impaired.

Boron compound (B)

As the boron compound (B) to be contained in EVOH (A), there may be mentioned boric acid and metal salts thereof, such as calcium borate, cobalt borate, zinc borates (zinc tetraborate, zinc metaborate, etc.), potassium aluminum borate, ammonium borates (ammonium metaborate, ammoniumtetraborate, ammoniumpentaborate, ammonium octaborate, etc.), cadmium borates (cadmium orthoborate, cadmium tetraborate, etc.), potassium borates (potassium metaborate, potassium tetraborate, potassium pentaborate, potassium hexaborate, potassium octaborate, etc.), silver borates (silver metaborate, silver tetraborate, etc.), copper borates (cupric borate, copper metaborate, copper tetraborate, etc. sodium borates (sodium metaborate, sodium diborate, sodium tetraborate, sodium pentaborate, sodium hexaborate, sodium octaborate, etc.), lead borates (lead metaborate, lead hexaborate, etc.), nickel borates (nickel orthoborate, nickel diborate, nickel tetraborate, nickel octaborate, etc.) barium borates (barium orthoborate, barium metaborate, barium diborate, barium tetraborate, etc.), bismuth borate, magnesium borates (magnesium orthoborate, magnesium diborate, magnesium metaborate, trimagnesium tetraborate, pentamagnesium tetraborate, etc.) manganese borates (manganous borate, manganese metaborate, manganese tetraborate, etc.), lithium borates (lithium metaborate, lithium tetraborate, lithium pentaborate, etc.) and the like, as well as borate minerals such as borax, kernite, inyoite, kotoite, suanite, szaibelyite and the like. Among these, borax, boric acid and sodium borates (sodium metaborate, sodium diborate, sodium tetraborate, sodium pentaborate, sodium hexaborate, sodium octaborate, etc.) are preferred.

The content of boron compound (B) per 100 parts by weight of EVOH (A) is, on the boron basis, 0.001 to 1 part by weight, preferably 0.001 to 0.5 part by weight, more preferably 0.002 to 0.1 part by weight. If the content thereof is below 0.001 part by weight, the boron compound (B) contained cannot produce any substantial effect thereof. If, conversely, said content is above 1% by weight, a large number of gels or fish eyes are formed, so that the objects of the invention cannot be attained.

Acetic acid (C)

Acetic acid (C) is an optional component which is added when necessary. The content of acetic acid (C) per 100 parts by weight of EVOH (A) is 0 to 0.05 part by weight, preferably 0.0005 to 0.03part by weight, more preferably 0.0005 to 0.01 part by weight. When the content of acetic acid (C) exceeds 0.05 part by weight, the long-run feature of the melt molding process decreases, hence the objects of the invention cannot be accomplished.

Acetic acid salt (D), phosphoric acid compound(E)

EVOH (A) further contains, as an essential component in addition to the above mentioned essential component boron compound (B), at least one compound selected from among an acetic acid salt (D) and a phosphoric acid compound (E). Both of (D) and (E) or either one of (D) and (E) may be contained in EVOH (A).

As the acetic acid salt (D) to be contained in EVOH (A), there may be mentioned sodium acetate, potassium acetate, calcium acetate, magnesium acetate, manganese acetate, copper acetate, cobalt acetate, zinc acetate and so forth. Particularly preferred are sodium acetate, potassium acetate, calcium acetate and magnesium acetate, however.

When the acetic acid salt (D) is contained in EVOH (A), the content of acetic acid salt (D) per 100 parts by weight of EVOH (A) is 0.001 to 0.05 part by weight, preferably 0.0015 to 0.04 part by weight, more preferably 0.002 to 0.03 part by weight, calculated on the metal basis. When the content of acetic acid salt (D) is below 0.001 part by weight on the metal basis, the long-run feature of the melt molding process and the interlaminar adhesion properties become poor. When said content is above 0.05 part by weight, the moldings will become poor in appearance. In either case, the objects of the invention cannot be achieved.

As the phosphoric acid compound (E) to be contained in EVOH (A), there may be mentioned sodium dihydrogen phosphate, disodium hydrogen phosphate, potassium dihydrogen phosphate, dipotassium hydrogen phosphate, tripotassium phosphate, calcium monohydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, manganese hydrogen phosphate and the like. Among them, sodium dihydrogen phosphate, potassium dihydrogen phosphate, calcium dihydrogen phosphate and magnesium dihydrogen phosphate are preferred.

When the phosphoric acid compound (E) is contained in EVOH (A), the content of phosphoric acid compound (E) per 100 parts by weight of EVOH (A) is set at 0.0005 to 0.05 part by weight, preferably 0.001 to 0.04 part by weight, more preferably 0.002 to 0.03 part by weight, calculated as the phosphate radical. When the content of phosphoric acid compound (E) is below 0.0005 part by weight on the phosphate radical basis, the long-run feature and the interlaminar adhesion become poor. When, on the other hand, said content is above 0.05 part by weight, the moldings will have a poor appearance. Hence, in either case, the objects of the invention cannot be accomplished.

Process for producing the resin composition

The above-mentioned resin compoisition can be produced by various methods that can cause the respective additive components to be finally contained in the respectively specified amounts in EVOH (A). Since, however, the process comprising bringing a porous precipitate of EVOH (A) from a water/alcohol solution into contact with an aqueous solution of the above-mentioned additive components and then drying the so-treated precipitate is particularly preferred from the viewpoint of efficient uniform dispersion of the components in EVOH (A), this process (hereinafter, process 1) is described below in detail.

More specifically, in this process 1, the above-mentioned resin composition is produced by bringing EVOH (A) with a water content of 20 to 80% by weight (preferably 30 to 70% by weight, more preferably 35 to 65% by weight) into contact with an aqueous solution containing a boron compound (B) as an essential component, acetic acid (C) as an optional component, and at least one compound selected from among an acetic acid salt (D) and a phosphoric acid compound (E) as an essential component, preferably under conditions such that the proportions of the respective additive components per 100 parts by weight of the sum total of the water contained in the aqueous solution and the water contained in EVOH (A) be set as follows:

boron compound (B): 0.001 to 0.5 part by weight (preferably 0.001 to 0.5 part by weight, more preferably 0.002 to 0.2 part by weight);

acetic acid (C): 0.005 to 1 part by weight;

acetic acid salt (D): 0.001 to 0.5 part by weight (preferably 0.005 to 0.4 part by weight, more preferably 0.01 to 0.3 part by weight); and phosphoric acid compound (E): 0.0001 to 0.5 part by weight (preferably 0.001 to 0.3 part by weight).

The aqueous solution mentioned above may contain an alcohol (in particular methanol) in addition to water.

When the water content of EVOH (A) is below 20% by weight, the resin composition obtained, when melt-molded, tend to give an increased number of minute fish eyes. When the water content of EVOH (A) is above 80% by weight, EVOH (A) tends to undergo fusion bonding in the later step of drying.

It is preferred that EVOH (A) be in the form of a porous precipitate. The porous precipitate has a microporous internal structure with micropores having a diameter of 0.1 to 10 $\mu$m uniformly distributed therein. Such a porous precipitate can be obtained by adequately adjusting, in the step of extruding an EVOH solution (solution in a water-alcohol mixed solvent) into a coagulation bath, the concentration of the EVOH solution (20 to 80% by weight), the temperature (45 to 70° C.), the solvent (water/alcohol mixing ratio 80/20 to 5/95 by weight), the temperature of the coagulation bath (1 to 20° C.), the residence time (0.25 to 30 hours) and the proportion of EVOH in the coagulation bath (0.02 to 2% by weight), among others. Water or a water-alcohol mixed solvent is suitable as the coagulation bath.

Alternatively, for preparing the EVOH (A) with a water content of 20 to 80% by weight, pellet-form (or powder-form in certain instances) EVOH may be mixed and stirred with water to thereby cause the EVOH to absorb water, or steam may be blown into EVOH. It is also possible to cause EVOH to contain water together with a certain amount of an alcohol, such as methanol or isopropyl alcohol in the process of producing the EVOH and, on that occasion, the EVOH may contain a small amount of a plasticizer, such as ethylene glycol, propylene glycol or glycerol.

It is important that the concentrations of the respective additive components in the aqueous solution be set in the ranges respectively specified above. When the concentrations of one or more of said components are below the above-specified ranges, the effects of their being contained cannot be expected. When, conversely, said concentrations are above the above-specified ranges, the resin composition obtained, when melt-molded, tend to form minute fish eyes (fish eyes with a diameter of less than 0.1 mm) on the moldings.

In causing EVOH (A) to contain a salt-type phosphoric acid compound (E), it is particularly desirable to bring the EVOH (A) into contact with an aqueous solution prepared by dissolving the phosphoric acid compound (E) in an acidic aqueous solution. In this way, an aqueous solution free of turbidity can be prepared and an EVOH resin composition excellent in melt moldability and long-run moldability and capable of preventing the formation of fish eyes less than 0.1 mm in diameter can be obtained. In most instances, the phosphoric acid compound (E) is dissolved at about 20 to 40° C.

On that occasion, boric acid (which is an example of boron compound (B)), acetic acid (C) or phosphoric acid is a preferred source of acidity of the acidic aqueous solution. The concentrations of these acids are preferably set at the levels mentioned above. The aqueous acid solution may contain about 0.001 to 0.1% by weight of methanol, ethanol, propanol, methyl acetate, ethyl acetate or the like.

As an alternative to the above-mentioned process 1, a process (hereinafter, process 2) may also be employed which comprises adding an aqueous solution containing the respective additive components mentioned above to a water/alcohol solution of EVOH (A) causing precipitation in a coagulation vessel and then drying the (porous) precipitate. In this case, too, the additive components can be dispersed uniformly and efficiently in EVOH (A).

As a modification of process 1 or 2, it is also possible to adjust the contents of acetic acid (C) and acetic acid salt (D) out of the components mentioned above in the process for producing EVOH. For example, it is possible to neutralize the alkali (sodium hydroxide) used in the step of saponification with acetic acid and adjust the amount of the byproduct acetic acid salt (sodium acetate) (D) by washing with water, for instance, or to adjust the excess of the acetic acid (C) used for neutralization by drying treatment, for instance.

Method of drying

Following the above step (for example, after contacting treatment with an aqueous solution containing the respective additive components according to process 1), drying is carried out.

While various methods of drying may be employed for the above purpose, the method comprising carrying out drying in a fluidized state, preceded or followed by drying in a stationary state, namely (i) performing drying in a fluidized state and then drying in a stationary state or (ii) performing drying in a stationary state and then drying in a fluidized state is preferred in the present invention.

In particular, the above-mentioned method (i) which comprises performing drying in a fluidized state, followed by drying in a stationary state is preferred since the discharge of the final composition in the step of melt molding can be securely prevented from varying.

The drying in a fluidized state as so referred to herein means drying of the resin composition substantially in the state of pellets or power or the like while it is stirred and dispersed mechanically or by means of hot air. As the drier for carrying out drying in a fluidized state, a cylinder-groove type stirrer drier, a cylindrical drier, a rotary drier, a fluidized bed drier, a vibrating fluidized bed drier, a conical rotary drier or the like may be used.

The drying in a stationary state as so referred to herein means drying to be carried out while the resin composition is substantially free from stirring or dispersion or any other dynamic action. As the drier to be used in carrying out drying in a stationary state, there may be mentioned, for example, such a material standing type drier as a box drier for batch operation, and such a material transfer type drier as a band drier, a tunnel drier or a vertical silo drier.

The above-mentioned method (i), which comprises drying in a fluidized state, followed by drying in a stationary state, is first illustrated in the following.

The heating gas to be used in the step of drying in a fluidized state is air or an inert gas (e.g. nitrogen gas, helium gas, argon gas). The temperature of the heating gas is preferably not higher than 95° C., more preferably 40 to 90° C. At a temperature above 95° C., the pellets or powder of EVOH (A) may possibly undergo fusion bonding.

The velocity of the heating gas in the drier is suitably adjusted to 0.7 to 10 m/sec, preferably 0.7 to 5.0 m/sec, more preferably 1.0 to 3.0 m/sec. At a heating gas velocity lower than 0.7 m/sec, the pellets or powder of EVOH may readily undergo fusion bonding. When said velocity exceeds 10 m/sec, the pellets may readily break or dust-size particles may readily be formed.

The time of drying in a fluidized state depends on the quantity of the resin composition to be treated, generally ranging from 5 minutes to 36 hours, preferably from 10 minutes to 24 hours.

The resin composition is subjected to drying treatment in a fluidized state under the conditions mentioned above, preferably until the water content of the resin composition after said treatment becomes 5 to 60% by weight (more preferably 10 to 55% by weight, most preferably 15 to 50% by weight). When said water content is below 5% by weight, the discharge tends to fluctuate in the step of melt molding of the final composition after drying treatment in a stationary state. When the water content is above 60% by weight, the resin composition in pellet or powder form tends to undergo fusion bonding in the subsequent drying treatment in a stationary state and the resin composition obtained tends to give minute fish eyes in the step of melt molding thereof.

In this drying in a fluidized state, it is preferred that the water content be reduced by at least 5% by weight (more preferably 10 to 45% by weight) as compared with the water content prior to said drying treatment in a fluidized state. When the reduction in water content is below 5% by weight, minute fish eyes tend to increase in number in the step of melt molding of the resin composition obtained.

The resin composition treated for fluidized state drying in the manner mentioned above is then subjected to drying treatment in a stationary state. The heating gas to be used in this stationary state drying treatment is also an inert gas (e.g. nitrogen gas, helium gas, argon gas). The heating gas temperature is suitably not lower than 75° C., preferably 85 to 150° C. At a heating gas temperature below 75° C., the drying time has to be extremely prolonged and this is economically disadvantageous.

The gas velocity within the drier is preferably lower than 1.0 m/sec, more preferably 0.01 to 0.5 m/sec. At a gas velocity exceeding 1.0 m/sec, it becomes difficult to maintain the resin composition in a still standing state.

The time of stationary state drying likewise depends on the quantity of the resin composition to be treated but, generally, it ranges preferably from 10 minutes to 72 hours, more preferably from 1 to 48 hours.

The resin composition is treated for stationary state drying under the above-mentioned conditions to give the final desired resin composition. It is preferred that the resin composition after the stationary state drying treatment (final treatment) have a water content of 0.001 to 2% by weight (more preferably 0.01 to 1% by weight). When the water content is lower than 0.001% by weight, the long-run moldability of the resin composition tends to decrease and, when it is above 2% by weight, defects due to foaming of water will readily be formed on the moldings.

The above-mentioned method (ii), which comprises first conducting stationary state drying treatment and then conducing fluidized state drying treatment is now illustrated.

In this case, the stationary state drying treatment is carried out under essentially the same conditions as in the above-mentioned stationary state drying treatment except that the heating gas temperature is preferably not higher than 100° C., more preferably 40 to 95° C. At a heating gas temperature above 100° C., the pellets or powder of EVOH tends to undergo fusion bonding.

As for the time of stationary state drying treatment, it is generally preferred that said time be 10 minutes to 48 hours, more preferably 30 minutes to 36 hours, although said time depends on the quantity of the resin composition to be treated.

The water content of the resin composition after stationary state drying treatment is preferably 10 to 70% by weight (more preferably 15 to 60% by weight, most preferably 20 to 50% by weight). When said water content is below 10% by weight, there is a tendency toward an increase in number of minute fish eyes in the step of melt molding of the final composition after fluidized state drying treatment. When, conversely, said water content is above 70% by weight, the discharge tends to vary in the step of melt molding of the final product.

In this stationary state drying treatment, it is preferred that the water content be reduced by at least 3% by weight (preferably 5 to 30% by weight) as compared with the water content prior to said stationary state drying treatment. When the reduction in water content is smaller than 3% by weight, the final product tends to contain an increased amount of dust and broken pellets.

The resin composition treated for stationary state drying in the above manner is then subjected to fluidized state drying treatment. The fluidized state drying conditions are fundamentally the same as those in the above-mentioned fluidized state drying treatment except that the heating gas temperature is preferably not lower than 80° C., more preferably 95 to 150° C. At a heating gas temperature lower than 80° C., the drying period has to be extremely prolonged, which is economically disadvantageous.

It is generally preferred that the fluidized state drying time be 10 minutes to 48 hours, more preferably 30 minutes to 24 hours, although said time depends on the quantity of the resin composition to be treated.

Through the step of such fluidized state drying treatment, the desired resin composition having a water content of 0.001 to 2% by weight is obtained, like in the method (i) mentioned above.

Melt molding

In the present invention, the desired resin composition in obtained only when EVOH (A) contains the essential component boron compound (B), the optional component acetic acid (C) and at least one compound selected from among an acetic acid salt (D) and a phosphoric acid compound (E) as the essential component in the respectively specified amounts. If these conditions are not satisfied, the objects of the present invention cannot be achieved.

The resin composition of the present invention may contain, when necessary, one or more additives selected from among plasticizers, heat stabilizers, ultraviolet stabilizers, antioxidants, colorants, antimicrobial agents, fillers, other resins, and so forth. In particular, one or more gel formation preventing agents selected from among hydrotalcite compounds, hindered phenols, hindered amine heat stabilizers, and higher aliphatic carboxylic acid metal salts.

Two or more different EVOH species may be used as EVOH (A). In that case, by using a blend of EVOH species differing in ethylene content by not less than 5 mole percent or in saponification degree by not less than 1 mole percent, secondary processability characteristics, such as stretchability at a high degree of stretching or moldability in vacuum pressure forming or deep draw forming, can be improved while retaining the gas barrier properties.

As for the melt molding technique, extrusion molding (e.g. T-die extrusion, inflation extrusion, blow molding, melt spinning, contour extrusion) or injection molding is mainly employed. The melt molding temperature is selected within the range of 150 to 250° C. in most cases.

By this melt molding, various moldings such as films, sheets, containers, fibers, rods and tubes can be obtained. Grinds of these moldings (e.g. in the case of recycling recovered products) or pellets are used and subjected to melt molding in many instances.

Laminate

The resin composition obtained according to the present invention can be used in producing shaped articles as mentioned above. In particular, it is preferably used in producing a laminate comprising a layer of said resin composition and a layer of a thermoplastic resin layer as overlaid on at least one side of said resin composition layer. In this way, laminates suited for practical use can be obtained.

The laminate obtained, in which the EVOH composition of the invention is used, shows very excellent effects not only in gas barrier properties and transparency but also in interlaminar adhesion in the step of secondary processing such as high stretching, vacuum pressure forming or deep draw.

In producing the laminate, another substrate material is overlaid on one side or both sides of a layer of the EVOH composition obtained according to the present invention. As the method of lamination, there may be mentioned the method comprising melt extruding a thermoplastic resin onto a film or sheet made of said composition, the method comprising reversely melt extruding said composition onto a substrate made of a thermoplastic resin, the method comprising coextruding said resin composition and another thermoplastic resin composition, and the method comprising laminating a film or sheet of the EVOH composition obtained according to the invention with a film or sheet of another base material using an adhesive (e.g. organic titanium compound, isocyanate compound, polyester compound, polyurethane compound), among others.

As the counterpart resin to be used in coextrusion, there may be mentioned polyolefin resins in a broad sense of the term, including olefin homopolymers and copolymers such as linear low density polyethylene, low density polyethylene, medium density polyethylene, high density polyethylene, ethylene-vinyl acetate copolymers, ionomers, ethylene-propylene copolymers, ethylene-acrylic ester copolymers, polypropylene, propylene-α-olefin (α-olefin with 4 to 20 carbon atoms) copolymers, polybutene and polypentene, olefin homopolymers and copolymers graft-modified with an unsaturated carboxylic acid or an ester thereof, and the like as well as polyesters, polyamides, copolyamides, polyvinyl chloride, polyvinylidene chloride, acrylic resins, polystyrene, vinyl ester resins, polyester elastomers, polyurethane elastomers, chlorinated polyethylene, chlorinated polypropylene, and so on. Saponified ethylene-vinyl acetate copolymers can also be coextruded. Among the resins mentioned above, polypropylene, polyamides, polyethylene, ethylene-vinyl acetate copolymers, polystyrene and polyesters are preferred from the viewpoint of ease of coextrusion film formation and practicality of physical properties of films (in particular strength).

Furthermore, in those cases in which a molding such as a film or sheet is once prepared from the resin composition obtained according to the present invention and then extrusion-coated with another substrate material or laminated with a molding such as a film or sheet of another substrate material, it is also possible to use an arbitrarily selected substrate (e.g. paper, metal foil, uniaxially or biaxially stretched plastic film or sheet, woven fabric, nonwoven fabric, metal, woody material) besides the thermoplastic resins mentioned above.

When a ($a_1$, $a_2$, . . . ) designates a layer(s) of the resin composition obtained according to the invention and b ($b_1$, $a_2$, . . . ) designates a layer(s) of another substrate material(s), for example a thermoplastic resin(s), the layer constitution of the laminate may include not only the two-layer structure a/b but also various arbitrary combinations such as b/a/b, a/b/a, $a_1/a_2$/b, a/$b_1/b_2$, and $b_2/b_1$/a/$b_1/b_2$ in the case of films, sheets or bottles. In the case of filaments, too, various arbitrary combinations of a and b are possible, for example a/b bimetal type, core (a)-sheath (b) type, core (b)-sheath (a) type and eccentric core-sheath types.

In the case of coextrusion, resin composition a may be blended with resin composition b, or b with a, or a resin capable of improving the adhesiveness of both layer surfaces may be incorporated in at least one of a and b.

The laminate of the present invention may be used directly in various forms and it is also preferred that the laminate be subjected to stretching for further improving the physical properties thereof.

In the present invention, a stretched film, stretched sheet, stretched bottle or like product can be obtained without undergoing or causing breaking, pin hole formation, cracking, unevenness, delamination or the like.

The stretching may be either uniaxial or biaxial and a draw ratio as high as possible is preferred from the physical properties viewpoint.

As for the method of stretching, roll stretching, tenter stretching, tubular stretching and stretch blowing as well as high draw ratio deep draw or vacuum forming can be employed, among others. In the case of biaxial stretching, either of the simultaneous biaxial stretching and successive biaxial stretching techniques can be employed. The stretching temperature is selected within the range of 80 to 170° C., preferably about 100 to 160° C.

After completion of the stretching, thermal fixation is generally carried out. The thermal fixation can be effected by per se known means. Thus, the above-mentioned stretched film is subjected to heat treatment at 80 to 170° C., preferably 100 to 160°C., for about 2 to 600 seconds while maintaining said film in a taut condition.

For use as a heat-shrinkable wrapping material for raw meat, processed meat, cheese or the like, the stretched film is used as a product film without performing thermal fixation. After wrapping of said raw meat, processed meat, cheese or the like in said film, the whole is subjected to heat treatment at 50 to 130° C., preferably 70 to 120° C., for about 2 to 300 seconds to thereby cause thermal shrinking of the film to attain tightly sealed packing.

The thus-obtained laminate may have any arbitrary form and shape. Examples are films, sheets, tapes, bottles, pipes, filaments, modified cross-section extrudates and the like. When necessary, the laminate obtained may be subjected to heat treatment, cooling treatment, rolling treatment, printing treatment, dry lamination treatment, solution or melt coating treatment, bag making processing, deep draw processing, box making processing, tube making processing, splitting processing, etc.

The film, sheet, container or the like obtained in the above manner is useful as a wrapping material for various materials such as foodstuffs, drugs, industrial chemicals, agrochemicals, etc.

BEST MODES FOR CARRYING OUT THE INVENTION

The following examples are further illustrative of the present invention. In the following, "part(s)" and "1%" are on the weight basis, unless otherwise specified. The melt index (MI) data were determined at 21° C. under a load of 2160 g.

EXAMPLES 1 TO 12 AND COMPARATIVE EXAMPLES 1 TO 10

Example 1

A post-saponification water/methanol solution of EVOH with an ethylene content of 35 mole percent, a saponification degree of 99.5 mole percent and a MI of 20 g/10 min was extruded into and coagulated in water in the form of a strand, followed by cutting for pelletization, to give a hydrous, porous precipitate (containing 100 parts of water per 100 parts of EVOH (A)). This hydrous, porous precipitate was then washed with a 0.5% aqueous solution of acetic acid and further with water, placed in an aqueous solution containing 0.2% boric acid (B), 0.1% acetic acid (C) and 0.1% sodium acetate (D) and, after 5 hours of stirring at 30° C., dried under the conditions specified below to give an EVOH composition containing 0.03 part (calculated as boron) of boric acid (B), 0.009 part of acetic acid (C) and 0.01 part (calculated as sodium) of sodium acetate (D), per 100 parts of EVOH (A).

The drying was carried out as follows: the pellets (water content 50%) after contacting with the aqueous solution containing the respective additive components were first dried in a fluidized bed drier for batchwise operation in a fluidized state in nitrogen gas at 70° C., for about 3 hours until a water content of 25% and then dried to a water content of 0.3% by stationary state drying in a box drier for batchwise operation in a nitrogen gas at 120° C. for about 22 hours.

The EVOH composition obtained was then fed to a single screw extruder equipped with a T die and molded into an EVOH film having a thickness of 120 μm under the conditions mentioned below. The film was evaluated for appearance and long-run characteristics in the manner mentioned below. The discharge during film formation was stable.

| Single screw extruder film formation conditions | |
|---|---|
| Screw inside diameter | 40 mm |
| L/D | 28 |
| Screw compression ratio | 3.2 |
| T die | Coat hanger type |
| Die width | 450 mm |
| Extrusion temperatures | $C_1$: 180° C.  H: 210° C. |
| | $C_2$: 200° C.  D: 210° C. |
| | $C_3$: 220° C. |
| | $C_4$: 220° C. |

(Appearance)

The appearance of the above-mentioned film directly after molding (sample size 10 cm×10 cm) was evaluated by the eye with respect to the occurrence of (1) striae and (2) fish eyes (fish eyes with a diameter of not less than 0.01 mm and less than 0.1 mm) according to the following criteria:
(1) Striae
○: No striae are observed.
Δ: A slight number of striae are observed but produces no problem from the practical use viewpoint.
×: A large number of striae are observed, making the practical use impossible.
(2) Fish eyes
⊚: 0 to 3; ○: 4 to 10; Δ: 11 to 50; ×: 51 or more.
(Long run feature)

The above molding procedure was conducted for 10 days continuously and the mold films finally obtained were observed by the eye and evaluated for the increases in number of striae, gels and fish eyes according to the following criteria:
○: No increase is observed.
Δ: A slight increase is observed.
×: A remarkable increase is observed.

Further, using the EVOH composition obtained, a multilayer film having the layer constitution of polypropylene layer/adhesive resin layer/EVOH composition layer/adhesive resin layer/polypropylene layer was produced by means of a feel block 5-layer T die. The discharge of the EVOH composition during the multilayer film formation was stable.

The precise film constitution was as follows: both outside polypropylene layers (the MI of the polypropylene being 1.2 g/10 min) each having a thickness of 100 μm, both adhesive resin layers (the adhesive resin being maleic anhydride-modified polypropylene with a MI of 2.6 g/10 min) each having a thickness of 25 μm and the intermediate EVOH layer having a thickness of 50 μm.

Such multilayer film was evaluated for uniformity in stretching and interlaminar adhesion as follows.
(Uniformity or unevenness in stretching)

Samples (8 cm×8 cm in size) were taken from the above multilayer laminate, preheated at 150° C. for 1 minute and then subjected to successive biaxial stretching (3 times in the longitudinal direction and 3 times in the transverse direction; total stretching ratio=9) at a stretching speed of 100 mm/sec, and the stretched film samples thus obtained were evaluated for appearance change according to the following criteria:
⊚: No striation is observed.
○: A slight number of small striae are observed but produces no problem from the practical use viewpoint.
Δ: One or two large striae are observed, imposing limitations on the practical use.
×: Three or more large striae are observed, making the practical use impossible.
(Interlaminar adhesion)

The stretched film samples mentioned above were tested for the bond strength between the EVOH layer and the adhesive layer on an autograph by the T peel method at 20° C. and a rate of pulling of 300 mm/min. The evaluation criteria were as follows:
○: Not less than 1,000 g/15 mm.
Δ: Not less than 300 but less than 1,000 g/15 mm.
×: Less than 300 g/15 mm.

Example 2

A porous precipitate (containing 150 parts of water per 100 parts of EVOH (A)) obtained from a post-saponification water/methanol solution of EVOH with an ethylene content of 40 mole percent, a saponification degree of 99 mole percent and a MI of 30 g/10 min was washed with water to thereby remove the byproduct sodium acetate (D) resulting from saponification to a level of 0.3% and then further placed in an aqueous solution containing 0.2% boric acid (B) and 0.1% acetic acid (C). The mixture was stirred at 30° C. for 4 hours, followed by drying under the conditions specified below, to give an EVOH composition of the present invention containing 0.02 part (calculated as boron) of boric acid (B), 0.008 part of acetic acid (C) and 0.02 part (calculated as sodium) of sodium acetate (D) per 100 parts of EVOH (A). The composition was evaluated in the same manner as in Example 1.

The drying was performed following the procedure of Example 1, as follows: the pellets with a water content of 60% was dried in a fluidized state at 80° C. for 3 hours to thereby reduce the water content to 22% and then the water content was reduced to 0.3% by drying in a stationary state at 125° C. for 20 hours.

Example 3

Proceeding in the same manner as in Example 1 except that the porous precipitate was treated with an aqueous solution containing 0.5% boric acid (B), 0.1% acetic acid (C) and 0.05% sodium acetate (D), an EVOH composition containing 0.07 part (calculated as boron) of boric acid (B), 0.008 part of acetic acid (C) and 0.006 part (calculated as sodium) of sodium acetate (D) per 100 parts of EVOH (A) was obtained. This was evaluated in the same manner as in Example 1.

The drying was performed following the procedure of Example 1, as follows: the pellets with a water content of 50% was dried in a fluidized state at 70° C. for 2 hours to thereby reduce the water content to 30% and then the water content was reduced to 0.3% by drying in a stationary state at 125° C. for 24 hours.

Example 4

Proceeding in the same manner as in Example 2 except that the porous precipitate was treated with an aqueous solution containing 0.1% boric acid (B) and 0.05% acetic acid (C), an EVOH composition containing 0.009 part (calculated as boron) of boric acid (B),0.005 part of acetic acid (C) and 0.02 part (calculated as sodium) of sodium acetate (D) per 100 parts of EVOH (A) was obtained. This was evaluated in the same manner as in Example 1.

The drying was performed following the procedure of Example 1, as follows: the pellets with a water content of 50% was dried in a fluidized state at 70° C. for 3 hours to thereby reduce the water content to 25% and then the water content was reduced to 0.3% by drying in a stationary state at 120° C. for 22 hours.

Example 5

Proceeding in the same manner as in Example 2 except that a mixture of an EVOH species ($A_1$) with an ethylene content of 30 mole percent, a saponification degree of 99.5 mole percent and a MI of 20 g/10 min and another EVOH species ($A_2$) with an ethylene content of 42 mole percent, a saponification degree of 99.6 mole percent and a MI of 15 g/10 min (mixing ratio $A_1/A_2$=70/30 by weight) was used as EVOH (A), an EVOH composition containing 0.018 part (calculated as boron) of boric acid (B), 0.008 part of acetic acid (C) and 0.02 part (calculated as sodium) of sodium acetate (D) per 100 parts of EVOH (A) was obtained. This was evaluated in the same manner as in Example 1.

The drying was performed following the procedure of Example 1, as follows: the pellets with a water content of 60% was dried in a fluidized state at 80° C. for 3 hours to thereby reduce the water content to 22% and then the water content was reduced to 0.3% by drying in a stationary state at 125° C. for 20 hours.

Example 6

Proceeding in the same manner as in Example 1 except that a mixture of an EVOH species ($A_1$) with an ethylene content of 30 mole percent, a saponification degree of 99.5 mole percent and a MI of 20 g/10 min and another EVOH species ($A_2$) with an ethylene content of 47 mole percent, a saponification degree of 97 mole percent and a MI of 35 g/10 min (mixing ratio $A_1/A_2$=80/20 by weight) was used as EVOH (A), an EVOH composition containing 0.029 part (calculated as boron) of boric acid (B), 0.009 part of acetic acid (C) and 0.011 part (calculated as sodium) of sodium acetate (D) per 100 parts of EVOH (A) was obtained. This was evaluated in the same manner as in Example 1.

The drying was performed following the procedure of Example 1, as follows: the pellets with a water content of 50% was dried in a fluidized state at 70° C. for 2 hours to thereby reduce the water content to 30% and then the water content was reduced to 0.3% by drying in a stationary state at 125° C. for 24 hours.

Example 7

Proceeding in the same manner as in Example 1 except that the porous precipitate was treated with an aqueous solution containing 0.5% boric acid (B), 0.1% acetic acid (C) and 0.015% sodium dihydrogen phosphate (E), an EVOH composition containing 0.07 part (calculated as boron) of boric acid (B), 0.008 part of acetic acid (C) and 0.01 part (calculated as phosphate radical) of sodium dihydrogen phosphate (E) per 100 parts of EVOH (A) was obtained. This was evaluated in the same manner as in Example 1.

The drying was performed following the procedure of Example 1, as follows: the pellets with a water content of 50% was dried in a fluidized state at 70° C. for 3 hours to thereby reduce the water content to 25% and then the water content was reduced to 0.3% by drying in a stationary state at 120° C. for 22 hours.

Example 8

Proceeding in the same manner as in Example 1 except that EVOH (A) with an ethylene content of 40 mole percent, a saponification degree of 99 mole percent and a MI of 30 g/10 min and that the porous precipitate was treated with an aqueous solution containing 0.2% boric acid (B), 0.1% acetic acid (C) and 0.007% calcium dihydrogen phosphate (E), an EVOH composition containing 0.02 part (calculated as boron) of boric acid (B), 0.008 part of acetic acid (C) and 0.005 part (calculated as phosphate radical) of calcium dihydrogen phosphate (E) per 100 parts of EVOH (A) was obtained. This was evaluated in the same manner as in Example 1.

The drying was performed following the procedure of Example 1, as follows: the pellets with a water content of 50% was dried in a fluidized state at 75° C. for 3 hours to thereby reduce the water content to 20% and then the water content was reduced to 0.3% by drying in a stationary state at 125° C. for 18 hours.

Example 9

Proceeding in the same manner as in Example 1 except that the porous precipitate was treated with an aqueous solution containing 0.5% boric acid (B), 0.1% acetic acid (C) and 0.018% magnesium dihydrogen phosphate (E), an EVOH composition containing 0.07 part (calculated as boron) of boric acid (B), 0.008 part of acetic acid (C) and 0.015 part (calculated as phosphate radical) of magnesium dihydrogen phosphate (E) per 100 parts of EVOH (A) was obtained. This was evaluated in the same manner as in Example 1.

The drying was performed following the procedure of Example 1, as follows: the pellets with a water content of 50% was dried in a fluidized state at 70° C. for 3 hours to thereby reduce the water content to 25% and then the water content was reduced to 0.3% by drying in a stationary state at 120° C. for 22 hours.

Example 10

Proceeding in the same manner as in Example 8 except that the porous precipitate was treated with an aqueous solution containing 0.1% boric acid (B), 0.05% acetic acid (C) and 0.01% potassium dihydrogen phosphate (E), an EVOH composition containing 0.009 part (calculated as boron) of boric acid (B), 0.005 part of acetic acid (C) and 0.008 part (calculated as phosphate radical) of potassium dihydrogen phosphate (E) per 100 parts of EVOH (A) was obtained. This was evaluated in the same manner as in Example 1.

The drying was performed following the procedure of Example 1, as follows: the pellets with a water content of 50% was dried in a fluidized state at 75° C. for 4 hours to thereby reduce the water content to 18% and then the water content was reduced to 0.3% by drying in a stationary state at 115° C. for 28 hours.

Example 11

Proceeding in the same manner as in Example 8 except that a mixture of an EVOH species ($A_1$) with an ethylene content of 30 mole percent, a saponification degree of 99.5 mole percent and a MI of 20 g/10 min and another EVOH species ($A_2$) with an ethylene content of 42 mole percent, a saponification degree of 99.6 mole percent and a MI of 15 g/10 min (mixing ratio $A_1/A_2$=70/30 by weight) was used as EVOH (A), an EVOH composition containing 0.018 part (calculated as boron) of boric acid (B), 0.008 part of acetic acid (C) and 0.005 part (calculated as phosphate radical) of calcium dihydrogen phosphate (E) per 100 parts of EVOH (A) was obtained. This was evaluated in the same manner as in Example 1.

The drying was performed following the procedure of Example 1, as follows: the pellets with a water content of 50% was dried in a fluidized state at 75° C. for 3 hours to thereby reduce the water content to 20% and then the water content was reduced to 0.3% by drying in a stationary state at 125° C. for 18 hours.

Example 12

Proceeding in the same manner as in Example 7 except that a mixture of an EVOH species ($A_1$) with an ethylene content of 30 mole percent, a saponification degree of 99.5 mole percent and a MI of 20 g/10 min and another EVOH species ($A_2$) with an ethylene content of 47 mole percent, a saponification degree of 97 mole percent and a MI of 35 g/10 min (mixing ratio $A_1/A_2$=80/20 by weight) was used as EVOH (A), an EVOH composition containing 0.029 part (calculated as boron) of boric acid (B), 0.009 part of acetic acid (C) and 0.011 part (calculated as phosphate radical) of sodium dihydrogen phosphate (E) per 100 parts of EVOH (A) was obtained. This was evaluated in the same manner as in Example 1.

The drying was performed following the procedure of Example 1, as follows: the pellets with a water content of 50% was dried in a fluidized state at 70° C. for 3 hours to thereby reduce the water content to 25% and then the water content was reduced to 0.3% by drying in a stationary state at 120° C. for 22 hours.

Comparative Example 1

Proceeding in the same manner as in Example 1 except that the concentration of boric acid (B) in the aqueous solution was 0.001%, an EVOH composition containing 0.0005 part (calculated as boron) of boric acid (B), 0.009 part of acetic acid (C) and 0.01 part (calculated as sodium) of sodium acetate (D) per 100 parts of EVOH (A) was obtained and evaluated in the same manner.

Comparative Example 2

Proceeding in the same manner as in Example 1 except that the concentration of boric acid (B) in the aqueous solution was 3%, an EVOH composition containing 1.3 part (calculated as boron) of boric acid (B), 0.009 part of acetic acid (C) and 0.01 part (calculated as sodium) of sodium acetate (D) per 100 parts of EVOH (A) was obtained and evaluated in the same manner.

Comparative Example 3

Proceeding in the same manner as in Example 1 except that the concentration of acetic acid (C) in the aqueous solution was 1%, an EVOH composition containing 0.03 part (calculated as boron) of boric acid (B), 0.08 part of acetic acid (C) and 0.006 part (calculated as sodium) of sodium acetate (D) per 100 parts of EVOH (A) was obtained and evaluated in the same manner.

Comparative Example 4

Proceeding in the same manner as in Example 1 except that the concentration of sodium acetate (D) in the aqueous solution was 0.005%, an EVOH composition containing 0.03 part (calculated as boron) of boric acid (B), 0.009 part of acetic acid (C) and 0.0005 part (calculated as sodium) of sodium acetate (D) per 100 parts of EVOH (A) was obtained and evaluated in the same manner.

Comparative Example 5

Proceeding in the same manner as in Example 1 except that the concentration of sodium acetate (D) in the aqueous solution was 0.9%, an EVOH composition containing 0.03 part (calculated as boron) of boric acid (B), 0.009 part of acetic acid (C) and 0.08 part (calculated as sodium) of sodium acetate (D) per 100 parts of EVOH (A) was obtained and evaluated in the same manner.

Comparative Example 6

Proceeding in the same manner as in Example 7 except that the concentration of boric acid (B) in the aqueous solution was 0.001%, an EVOH composition containing 0.0005 part (calculated as boron) of boric acid (B), 0.009 part of acetic acid (C) and 0.01 part (calculated as phosphate radical) of sodium dihydrogen phosphate (E) per 100 parts of EVOH (A) was obtained. This was evaluated in the same manner as in Example 1

Comparative Example 7

Proceeding in the same manner as in Example 7 except that the concentration of boric acid (B) in the aqueous solution was 3%, an EVOH composition containing 1.3 part (calculated as boron) of boric acid (B), 0.009 part of acetic acid (C) and 0.01 part (calculated as phosphate radical) of sodium dihydrogen phosphate (E) per 100 parts of EVOH (A) was obtained. This was evaluated in the same manner as in Example 1.

Comparative Example 8

Proceeding in the same manner as in Example 7 except that the concentration of acetic acid (C) in the aqueous solution was 1%, an EVOH composition containing 0.03 part (calculated as boron) of boric acid (B), 0.08 part of acetic acid (C) and 0.01 part (calculated as phosphate radical) of sodium dihydrogen phosphate (E) per 100 parts of EVOH (A) was obtained. This was evaluated in the same manner as in Example 1.

Comparative Example 9

Proceeding in the same manner as in Example 7 except that the concentration of sodium dihydrogen phosphate (E) in the aqueous solution was 0.0005%, an EVOH composition containing 0.03 part (calculated as boron) of boric acid (B), 0.009 part of acetic acid (C) and 0.0003 part (calculated as phosphate radical) of sodium dihydrogen phosphate (E) per 100 parts of EVOH (A) was obtained. This was evaluated in the same manner as in Example 1.

Comparative Example 10

Proceeding in the same manner as in Example 7 except that the concentration of sodium dihydrogen phosphate (E) in the aqueous solution was 0.1%, an EVOH composition containing 0.03 part (calculated as boron) of boric acid (B), 0.009 part of acetic acid (C) and 0.08 part (calculated as phosphate radical) of sodium dihydrogen phosphate (E) per 100 parts of EVOH (A) was obtained. This was evaluated in the same manner as in Example 1.

The evaluation results obtained in Example 1 to 6, Examples 7 to 12, Comparative Examples 1 to 5 and Comparative Examples 6 to 10 are summarized in Table 1.

TABLE 1

|  | Appearance (1) | Appearance (2) | Long-run feature | Uniformity in stretching | Interlaminar adhesion |
|---|---|---|---|---|---|
| Example 1 | ○ | ◎ | ○ | ○ | ○ |
| Example 2 | ○ | ◎ | ○ | ◎ | ○ |
| Example 3 | ○ | ◎ | ○ | ○ | ○ |
| Example 4 | ○ | ◎ | ○ | ◎ | ○ |
| Example 5 | ○ | ◎ | ○ | ◎ | ○ |
| Example 6 | ○ | ◎ | ○ | ◎ | ○ |
| Example 7 | ○ | ◎ | ○ | ○ | ○ |
| Example 8 | ○ | ◎ | ○ | ◎ | ○ |
| Example 9 | ○ | ◎ | ○ | ○ | ○ |
| Example 10 | ○ | ◎ | ○ | ◎ | ○ |
| Example 11 | ○ | ◎ | ○ | ◎ | ○ |
| Example 12 | ○ | ◎ | ○ | ◎ | ○ |
| Compar. Exa. 1 | ○ | ◎ | ○ | X | X |
| Compar. Exa. 2 | Δ | X | Δ | Δ | ○ |
| Compar. Exa. 3 | ○ | ○ | X | ○ | ○ |
| Compar. Exa. 4 | ○ | Δ | X | X | Δ |
| Compar. Exa. 5 | X | Δ | ○ | X | ○ |
| Compar. Exa. 6 | ○ | ◎ | ○ | X | X |
| Compar. Exa. 7 | Δ | X | Δ | Δ | ○ |
| Compar. Exa. 8 | ○ | ○ | X | ○ | ○ |
| Compar. Exa. 9 | ○ | X | X | X | Δ |
| Compar. Exa. 10 | X | X | ○ | X | ○ |

EXAMPLES 13 TO 25 AND COMPARATIVE EXAMPLES 11 TO 22

Example 13

A solution of EVOH (ethylene content 35 mole percent, saponification degree 99.5 mole percent, MI 12 g/10 min) (A) in water/methanol (water/methanol mixing ratio=40/60 by weight) (60° C., EVOH concentration 45%) was extruded for coagulation in a strand form into a water bath maintained at 5° C., followed by cutting with a cutter, to give pellets (diameter 4 mm, length 4 mm) of EVOH. The EVOH pellets were further placed in warm water at 30° C. After about 4 hours of stirring, a porous precipitate (with micropores having an average diameter of 4 μm being uniformly distributed) with a water content of 50% was obtained.

The thus-obtained porous precipitate (100 parts) was then placed in 200 parts of an aqueous solution containing 0.08% boric acid (B) and 0.038% sodium dihydrogen phosphate (E) (0.064 part of boric acid (B) and 0.03 part of sodium dihydrogen phosphate (E) per 100 parts of total water). After 5 hours of stirring at 30° C., the precipitate was recovered and dried under the conditions mentioned below to give a resin composition containing 0.038 part (calculated as boron) of the boron compound (B) and 0.009 part (calculated as phosphate radical) of the phosphoric acid compound (E) per 100 parts of EVOH (A).

(Fluidized state drying step)

The resin composition (water content 50%) obtained in the above manner was dried in a fluidized state caused by nitrogen gas at 75° C. for about 3 hours using a fluidized bed drier for batch operation (tower type), to give a resin composition with a water content of 20%.

(Stationary state drying step)

Then, using a box drier for batch operation (ventilation type), the resin composition after fluidized state drying treatment was further dried with nitrogen gas at 125° C. for about 18 hours, to give the desired resin composition with a water content of 0.3%.

(Laminate)

The resin composition obtained was fed to a multilayer extrusion apparatus equipped with a feed block 5-layer T die to give a 3-material 5-layer multilayer laminate having the constitution of polyethylene layer ("Novatec LD LF525H", product of Mitsubishi Chemical)/adhesive resin layer ("Modic AP240H", product of Mitsubishi Chemical)/resin composition layer/adhesive resin layer (same as above)/polyethylene layer (same as above) (50/10/20/10/50 (μm) in thickness). This was evaluated by the eye for minute fish eye formation and long-run moldability. The discharge of the EVOH composition during the multilayer film formation was stable.

(Fish eyes)

Film samples (10 cm×10 cm) just after the above-mentioned molding were observed by the eye for the number of fish eyes having a diameter of not less than 0.01 mm but less than 0.1 mm and evaluated according to the following criteria:

◎: 0 to 3; ○: 4 to 10; Δ: 11 to 50; ×: 51 or more.

(Long run moldability)

The above molding procedure was conducted for 10 days continuously and the moled films finally obtained were observed by the eye and evaluated for the increases in number of fish eyes according to the following criteria:

○: No increase is observed.
Δ: A slight increase is observed.
×: A remarkable increase is observed.

Example 14

A solution of EVOH (ethylene content 40 mole percent, saponification degree 99.0 mole percent, MI 6 g/10 min) (A) in water/methanol (water/methanol mixing ratio=20/80 by weight) (60° C.) was extruded for coagulation in a strand form into a water bath maintained at 5° C., followed by cutting with a cutter, to give pellets (diameter 4 mm, length 4 mm) of EVOH. The EVOH pellets were washed with warm water at 30° C. and placed in an aqueous solution of acetic acid. After about 2 hours of stirring, a porous precipitate (with micropores having an average diameter of 5 μm being uniformly distributed) with a water content of 55% was obtained.

The thus-obtained porous precipitate (100 parts) was then placed in 300 parts of an aqueous solution containing 0.05% borax (sodium tetraborate decahydrate) (B) and 0.036% sodium dihydrogen phosphate (E) (0.42 part of borax (B) and 0.03 part of sodium dihydrogen phosphate (E) per 100 parts of total water) After 5 hours of stirring at 30° C., the precipitate was recovered and dried under the conditions mentioned below to give a resin composition containing 0.032 part (calculated as boron) of the boron compound (B) and 0.009 part (calculated as phosphate radical) of the phosphoric acid compound (E) per 100 parts of EVOH (A).

(Fluidized state drying step)

The resin composition (water content 55%) obtained in the above manner was dried in a fluidized state caused by nitrogen gas at 75° C., for about 3 hours using a fluidized bed drier (horizontal multichamber type for continuous operation), to give a resin composition with a water content of 20%.

(Stationary state drying step)

Then, using a box drier for batch operation (ventilation type), the resin composition after fluidiwed state drying treatment was further dried with nitrogen gas at 120° C. for about 24 hours, to give the desired resin composition with a water content of 0.2%.

Example 15

The procedure of Example 13 was followed in the same manner except that the drying treatment process was modified as mentioned below, to give the desired resin composition.

(Stationary state drying step)

The resin composition (water content 50%) obtained in the above manner was dried in a stationary state with nitrogen gas at 70° C. for about 5 hours using a box drier for batch operation (ventilation type), to give a resin composition with a water content of 30%.

(Fluidized state drying step)

Then, using a tower type fluidized bed drier for batch operation, the resin composition after stationary state drying treatment was further dried in a fluidized state caused by nitrogen gas at 120° C. for about 18 hours, to give the desired resin composition with a water content of 0.2%.

Example 16

A solution of EVOH (ethylene content 30 mole percent, saponification degree 99.6 mole percent, MI 12 g/10 min) (A) in water/methanol (water/methanol mixing ratio=50/50 by weight) (60° C.) was extruded for coagulation in a strand form into a water bath maintained at 5° C., followed by cutting with a cutter, to give pellets (diameter 4 mm, length 5 mm) of EVOH. The EVOH pellets were washed with warm water at 30° C. and placed in an aqueous solution of acetic acid. After about 2 hours of stirring, a porous precipitate (with micropores having an average diameter of 4 $\mu$m being uniformly distributed) with a water content of 50% was obtained.

The thus-obtained porous precipitate (100 parts) was then placed in 250 parts of an aqueous solution containing 0.06% sodium diborate (B) and 0.036% sodium dihydrogen phosphate (E). After about 4 hours of stirring at 30° C., the precipitate was recovered and dried under the conditions mentioned below to give a resin composition containing 0.02 part (calculated as boron) of the boron compound (B) and 0.009 part (calculated as phosphate radical) of the phosphoric acid compound (E) per 100 parts of EVOH (A).

(Stationary state drying step)

The resin composition (water content 50%) obtained in the above manner was dried in a stationary state with nitrogen gas at 70° C. for about 8 hours using a ventilation type box drier for batch operation, to give a resin composition with a water content of 25%.

(Fluidized state drying step)

Then, using a tower type fluidized bed drier for batch operation, the resin composition after stationary state drying treatment was further dried in a fluidized state caused by nitrogen gas at 125° C. for about 18 hours, to give the desired resin composition with a water content of 0.3%.

Example 17

100 parts of the porous precipitate obtained in Example 13 was placed in 200 parts of an aqueous solution of 0.08% boric acid (B) and 0.06% magnesium dihydrogen phosphate (E) (0.064 part of boric acid (B) and 0.048 part of magnesium dihydrogen phosphate per 100 parts of total water). After 5 hours of stirring at 30° C., the precipitate was recovered and dried under the conditions mentioned below to give a resin composition containing 0.038 part (calculated as boron) of the boron compound (B) and 0.012 part (calculated as phosphate radical) of the phosphoric acid compound (E) per 100 parts of EVOH (A).

(Fluidized state drying step)

The resin composition (water content 50%) obtained in the above manner was dried in a fluidized state caused by nitrogen gas at 75° C. for about 3 hours using a fluidized bed drier for batch operation (tower type), to give a resin composition with a water content of 20%

(Stationary state drying step)

Then, using a box drier for batch operation (ventilation type), the resin composition after fluidized state drying treatment was further dried with nitrogen gas at 125° C. for about 18 hours, to give the desired resin composition with a water content of 0.3%.

Example 18

100 parts of the porous precipitate obtained in Example 14 was placed in 300 parts of an aqueous solution of 0.076% boric acid (B) and 0.007% calcium dihydrogen phosphate (E) (0.064 part of boric acid (B) and 0.006 part of calcium dihydrogen phosphate per 100 parts of total water). After 5 hours of stirring at 30° C., the precipitate was recovered and dried under the conditions mentioned below to give a resin composition containing 0.038 part (calculated as boron) of the boron compound (B) and 0.002 part (calculated as phosphate radical) of the phosphoric acid compound (E) per 100 parts of EVOH (A).

(Fluidized state drying step)

The resin composition (water content 55%) obtained in the above manner was dried in a fluidized state caused by nitrogen gas at 75° C. for about 3 hours using a fluidized bed drier (horizontal multichamber type for continuous operation), to give a resin composition with a water content of 20%.

(Stationary state drying step)

Then, using a box drier for batch operation (ventilation type), the resin composition after fluidized state drying treatment was further dried with nitrogen gas at 120° C. for about 24 hours, to give the desired resin composition with a water content of 0.2%.

Example 19

The procedure of Example 17 was followed in the same manner except that the drying treatment process was modified as mentioned below, to give the desired resin composition.

(Stationary state drying step)

The resin composition (water content 50%) obtained in the above manner was dried in a stationary state with nitrogen gas at 70° C. for about 5 hours using a box drier for batch operation (ventilation type), to give a resin composition with a water content of 30%.

(Fluidized state drying step)

Then, using a tower type fluidized bed drier for batch operation, the resin composition after stationary state drying treatment was further dried in a fluidized state caused by nitrogen gas at 120° C. for about 18 hours, to give the desired resin composition with a water content of 0.2%.

Example 20

Proceeding in the same manner as in Example 17 except that 0.03 part of sodium dihydrogen phosphate in lieu of magnesium dihydrogen phosphate (E) and that the drying was performed under the conditions mentioned below, a resin composition containing 0.038 part (calculated as boron) of the boron compound (B) and 0.009 part (calculated as phosphate radical) of the phosphoric acid compound per 100 parts of EVOH (A) was obtained.

(Stationary state drying step)

The wet resin composition (water content 50%) obtained was dried in a stationary state with nitrogen gas at 70° C., for about 5 hours using a box drier for batch operation (ventilation type), to give a resin composition with a water content of 30%.

(Fluidized state drying step)

Then, using a tower type fluidized bed drier for batch operation, the resin composition after stationary state drying treatment was further dried in a fluidized state caused by nitrogen gas at 120° C., for about 18 hours, to give the desired resin composition with a water content of 0.2%.

Example 21

100 parts of the porous precipitate obtained in Example 16 was placed in 250 parts of an aqueous solution of 0.077% boric acid (B) and 0.06% magnesium dihydrogen phosphate (E) (0.064 part of boric acid (B) and 0.05 part of magnesium dihydrogen phosphate per 100 parts of total water). After about 4 hours of stirring at 30° C., the precipitate was recovered and dried under the conditions mentioned below to give a resin composition containing 0.035 part (calculated as boron) of the boron compound (B) and 0.010 part (calculated as phosphate radical) of the phosphoric acid compound (E) per 100 parts of EVOH (A).
(Stationary state drying step)

The wet resin composition (water content 50%) obtained was dried in a stationary state with nitrogen gas at 70° C. for about 8 hours using a ventilation type box drier for batch operation, to give a resin composition with a water content of 25%.
(Fluidized state drying step)

Then, using a tower type fluidized bed drier for batch operation, the resin composition after stationary state drying treatment was further dried in a fluidized state caused by nitrogen gas at 125° C. for about 18 hours, to give the desired resin composition with a water content of 0.3%.

Example 22

100 parts of the porous precipitate obtained in Example 13 was placed in 200 parts of an aqueous solution of 0.08% boric acid (B) and 0.05% calcium acetate (D) (0.064 part of boric acid (B) and 0.04 part of calcium acetate per 100 parts of total water). After 5 hours of stirring at 30° C., the precipitate was recovered and dried under the conditions mentioned below to give a resin composition containing 0.038 part (calculated as boron) of the boron compound (B) and 0.008 part (calculated as calcium) of the acetic acid salt (D) per 100 parts of EVOH (A).
(Fluidized state drying step)

The resin composition (water content 50%) obtained in the above manner was dried in a fluidized state caused by nitrogen gas at 75° C., for about 3 hours using a fluidized bed drier for batch operation (tower type), to give a resin composition with a water content of 20%.
(Stationary state drying step)

Then, using a box drier for batch operation (ventilation type), the resin composition after fluidized state drying treatment was further dried with nitrogen gas at 125° C. for about 18 hours, to give the desired resin composition with a water content of 0.3%.

Example 23

100 parts of the porous precipitate obtained in Example 14 was placed in 300 parts of an aqueous solution of 0.076% boric acid (B) and 0.06% potassium acetate (D) (0.064 part of boric acid (B) and 0.05 part of calcium acetate (D) per 100 parts of total water). After 5 hours of stirring at 30° C., the precipitate was recovered and dried under the conditions mentioned below to give a resin composition containing 0.038 part (calculated as boron) of the boron compound (B) and 0.01 part (calculated as potassium) of the acetic acid salt (D) per 100 parts of EVOH (A).

(Fluidized state drying step)

The resin composition (water content 55%) obtained in the above manner was dried in a fluidized state caused by nitrogen gas at 75° C. for about 3 hours using a fluidized bed drier (horizontal multichamber type for continuous operation), to give a resin composition with a water content of 20%.
(Stationary state drying step)

Then, using a box drier for batch operation (ventilation type), the resin composition after fluidized state drying treatment was further dried with nitrogen gas at 120° C. for about 24 hours, to give the desired resin composition with a water content of 0.2%.

Example 24

The procedure of Example 22 was followed in the same manner except that the drying process was modified as mentioned below, to give the desired resin composition.
(Stationary state drying step)

The wet resin composition (water content 50%) obtained was dried in a stationary state with nitrogen gas at 70° C. for about 5 hours using a box drier for batch operation (ventilation type), to give a resin composition with a water content of 30%.
(Fluidized state drying step)

Then, using a tower type fluidized bed drier for batch operation, the resin composition after stationary state drying treatment was further dried in a fluidized state caused by nitrogen gas at 120° C. for about 18 hours, to give the desired resin composition with a water content of 0.2%.

Example 25

100 parts of the porous precipitate obtained in Example 16 was placed in 250 parts of an aqueous solution of 0.077% boric acid (B) and 0.06% sodium acetate (D). After about 4 hours of stirring at 30° C., the precipitate was recovered and dried under the conditions mentioned below to give a resin composition containing 0.035 part (calculated as boron) of the boron compound (B) and 0.015 part (calculated as sodium) of the acetic acid salt (D) per 100 parts of EVOH (A).
(Stationary state drying step)

The wet resin composition (water content 50%) obtained was dried in a stationary state with nitrogen gas at 70° C. for about 8 hours using a ventilation type box drier for batch operation, to give a resin composition with a water content of 25%.
(Fluidized state drying step)

Then, using a tower type fluidized bed drier for batch operation, the resin composition after stationary state drying treatment was further dried in a fluidized state caused by nitrogen gas at 125° C. for about 18 hours, to give the desired resin composition with a water content of 0.3%.

Comparative Example 11

The procedure of Example 13 was followed in the same manner except that the water content of the porous precipitate of EVOH (A) was adjusted to 10% and that the porous precipitate was treated with an aqueous solution of boric acid (B) alone. After finishing the drying process in the same manner, a resin composition containing 0.044 part (calculated as boron) of the boron compound (B) per 100 parts of EVOH (A) was obtained.

The water content of the resin composition after fluidized state drying treatment was 6% and the final water content of the resin composition after stationary state drying treatment was 0.1%.

Comparative Example 12

The procedure of Example 13 was followed in the same manner except that the water content of the porous precipitate of EVOH (A) as obtained from the water/methanol solution after saponification was adjusted to 90% and that the porous precipitate was treated with an aqueous solution of boric acid (B) alone. After finishing the drying process in the same manner, a resin composition containing 0.011 part (calculated as boron) of the boron compound (B) per 100 parts of EVOH (A) was obtained.

The water content of the resin composition after fluidized state drying treatment was 30% and the final water content of the resin composition after stationary state drying treatment was 0.3%.

Comparative Example 13

The procedure of Example 13 was followed in the same manner except that the amount of the boron compound (B) was adjusted to 0.0005 part per 100 parts of total water and that the porous precipitate was treated with an aqueous solution of boric acid (B) alone. After finishing the drying process in the same manner, a resin composition containing 0.0003 part (calculated as boron) of the boron compound (B) per 100 parts of EVOH (A) was obtained.

The water content of the resin composition after fluidized state drying treatment was 20% and the final water content of the resin composition after stationary state drying treatment was 0.3%.

Comparative Example 14

The procedure of Example 13 was followed in the same manner except that the amount of the boron compound (B) was adjusted to 1 part per 100 parts of total water and that the porous precipitate was treated with an aqueous solution of boric acid (B) alone. After finishing the drying process in the same manner, a resin composition containing 0.1 part (calculated as boron) of the boron compound (B) per 100 parts of EVOH (A) was obtained.

The water content of the resin composition after fluidized state drying treatment was 20% and the final water content of the resin composition after stationary state drying treatment was 0.3%.

Comparative Example 15

The procedure of Example 17 was followed in the same manner except that the water content of the porous precipitate of EVOH (A) was adjusted to 10% and that the porous precipitate was treated with an aqueous solution of magnesium dihydrogen phosphate (E) alone. After finishing the drying process in the same manner, a resin composition containing 0.024 part (calculated as phosphate radical) of the phosphoric acid compound (E) per 100 parts of EVOH (A) was obtained.

The water content of the resin composition after fluidized state drying treatment was 6% and the final water content of the resin composition after stationary state drying treatment was 0.1%.

Comparative Example 16

The procedure of Example 17 was followed in the same manner except that the water content of the porous precipitate of EVOH (A) as obtained from the water/methanol solution after saponification was adjusted to 90% and that the porous precipitate was treated with an aqueous solution of magnesium dihydrogen phosphate (E) alone. After finishing the drying process in the same manner, a resin composition containing 0.002 part (calculated as phosphate radical) of the phosphoric acid compound (E) per 100 parts of EVOH (A) was obtained.

The water content of the resin composition after fluidized state drying treatment was 30% and the final water content of the resin composition after stationary state drying treatment was 0.3%.

Comparative Example 17

The procedure of Example 17 was followed in the same manner except that the amount of the phosphoric acid compound (E) was adjusted to 0.00005 part per 100 parts of total water and that the porous precipitate was treated with an aqueous solution of magnesium dihydrogen phosphate (E) alone. After finishing the drying process in the same manner, a resin composition containing at most 0.0001 part (calculated as phosphate radical) of the phosphoric acid compound (E) per 100 parts of EVOH (A) was obtained.

The water content of the resin composition after fluidized state drying treatment was 20% and the final water content of the resin composition after stationary state drying treatment was 0.3%.

Comparative Example 18

The procedure of Example 17 was followed in the same manner except that the amount of the phosphoric acid compound (E) was adjusted to 2 parts per 100 parts of total water and that the porous precipitate was treated with an aqueous solution of magnesium dihydrogen phosphate (E) alone. After finishing the drying process in the same manner, a resin composition containing 0.25 part (calculated as phosphate radical) of the phosphoric acid compound (E) per 100 parts of EVOH (A) was obtained.

The water content of the resin composition after fluidized state drying treatment was 20% and the final water content of the resin composition after stationary state drying treatment was 0.3%.

Comparative Example 19

The procedure of Example 22 was followed in the same manner except that the water content of the porous precipitate of EVOH (A) was adjusted to 10% and that the porous precipitate was treated with an aqueous solution of calcium acetate (D) alone. After finishing the drying process in the same manner, a resin composition containing 0.01 part (calculated as calcium) of the acetic acid salt (D) per 100 parts of EVOH (A) was obtained.

The water content of the resin composition after fluidized state drying treatment was 6% and the final water content of the resin composition after stationary state drying treatment was 0.1%.

Comparative Example 20

The procedure of Example 22 was followed in the same manner except that the water content of the porous precipitate of EVOH (A) as obtained from the water/methanol solution after saponification was adjusted to 90% and that the porous precipitate was treated with an aqueous solution of calcium acetate (D) alone. After finishing the drying process in the same manner, a resin composition containing 0.005 part (calculated as calcium) of the acetic acid salt (D) per 100 parts of EVOH (A) was obtained.

The water content of the resin composition after fluidized state drying treatment was 30% and the final water content of the resin composition after stationary state drying treatment was 0.3%.

Comparative Example 21

The procedure of Example 22 was followed in the same manner except that the amount of the acetic acid salt (D) was adjusted to 0.0005 part per 100 parts of total water and that the porous precipitate was treated with an aqueous solution of calcium acetate (D) alone. After finishing the drying process in the same manner, a resin composition containing 0.0006 part (calculated as calcium) of the acetic acid salt (D) per 100 parts of EVOH (A) was obtained.

The water content of the resin composition after fluidized state drying treatment was 20% and the final water content of the resin composition after stationary state drying treatment was 0.3%.

Comparative Example 22

The procedure of Example 22 was followed in the same manner except that the amount of the acetic acid salt (D) was adjusted to 1 part per 100 parts of total water and that the porous precipitate was treated with an aqueous solution of calcium acetate (D) alone. After finishing the drying process in the same manner, a resin composition containing 0.1 part (calculated as calcium) of the acetic acid salt (D) per 100 parts of EVOH (A) was obtained.

The water content of the resin composition after fluidized state drying treatment was 20% and the final water content of the resin composition after stationary state drying treatment was 0.3%.

The results of evaluation of the resin compositions obtained in Examples 13 to 25 and Comparative Examples 11 to 22 are summarized in Table 2.

TABLE 2

|  | Fish eyes | Long-run moldability |
| --- | --- | --- |
| Example 13 | ◎ | ○ |
| Example 14 | ◎ | ○ |
| Example 15 | ◎ | ○ |
| Example 16 | ◎ | ○ |
| Example 17 | ◎ | ○ |
| Example 18 | ◎ | ○ |
| Example 19 | ◎ | ○ |
| Example 20 | ◎ | ○ |
| Example 21 | ◎ | ○ |
| Example 22 | ◎ | ○ |
| Example 23 | ◎ | ○ |
| Example 24 | ◎ | ○ |
| Example 25 | ◎ | ○ |
| Compar. Exa. 11 | X | Δ |
| Compar. Exa. 12 | Δ | X |
| Compar. Exa. 13 | ○ | X |
| Compar. Exa. 14 | X | X |
| Compar. Exa. 15 | X | Δ |
| Compar. Exa. 16 | Δ | X |
| Compar. Exa. 17 | ○ | X |
| Compar. Exa. 18 | X | X |
| Compar. Exa. 19 | X | Δ |
| Compar. Exa. 20 | Δ | X |
| Compar. Exa. 21 | ○ | X |
| Compar. Exa. 22 | X | X |

EXAMPLES 26 TO 41

Example 26

Calcium dihydrogen phosphate (E) was dissolved to a concentration of 0.35% in an 1.6% aqueous solution of boric acid (B). The resulting solution was then 50-fold diluted with water to finally give a mixed solution containing 0.032% boric acid (B) and 0.007% calcium dihydrogen phosphate (E).

A porous precipitate (containing 100 parts of water per 100 parts of EVOH (A)) resulting from a post-saponification water/methanol solution of EVOH (A) with an ethylene content of 35 mole percent, a saponification degree of 99.5 mole percent and a MI of 20 g/10 min was washed with water and then placed in the mixed solution mentioned above. The mixture was stirred at 30° C. for 5 hours and then treated under the same conditions as employed in Example 1, to give a resin composition containing 0.015 part (calculated as boron) of boric acid (B) and 0.005 part (calculated as phosphate radical) of calcium dihydrogen phosphate (E) per 100 parts of EVOH (A)
(Evaluation)

Then, the resin composition obtained was fed to a single-screw extruder equipped with a T die and molded into an EVOH film having a thickness of 120 μm under the same conditions as mentioned in Example 1. The discharge during film molding was stable.

Samples (10 cm×10 cm) of the film just after molding were observed by the eye for the occurrence of fish eyes having a diameter not smaller than 0.01 mm but smaller than 0.1 mm and evaluated according to the criteria mentioned in Example 1.

As for the long-run moldability, the above molding was conducted continuously for 10 days and samples of the last-obtained film were observed by the eye for the increase in number of fish eyes in the same manner and evaluated according to the criteria mentioned in Example 1.

Example 27

A mixed solution was prepared by charging and dissolving potassium dihydrogen phosphate (E) in a 0.05% aqueous solution of boric acid (B) to a concentration in the resulting mixed solution of 0.057%.

Then, EVOH (A) with an ethylene content of 40 mole percent, a saponification degree of 99 mole percent and a MI of 6 g/10 min was placed in the above mixed solution and, after 4 hours of stirring at 30° C., it was dried under the same conditions as used in Example 1, to give a resin composition containing 0.02 part (calculated as boron) of boric acid (B) and 0.02 part (calculated as phosphate radical) of potassium dihydrogen phosphate (E) per 100 parts of EVOH (A). The composition was evaluated in the same manner as in Example 26.

Example 28

A mixed solution was prepared by dissolving magnesium dihydrogen phosphate (E) in a 0.45% aqueous solution of boric acid (B) to a concentration of 0.92% and diluting the resulting solution with 50 volumes of water. Using this mixed solution and otherwise following the procedure of Example 26, an EVOH composition containing 0.004 part (calculated as boron) of boric acid (B) and 0.018 part (calculated as phosphate radical) of magnesium dihydrogen phosphate (E) per 100 parts of EVOH (A) was obtained and this was evaluated in the same manner.

Example 29

A mixed solution was prepared by dissolving sodium dihydrogen phosphate (E) in a 2.8% aqueous solution of boric acid (B) to a concentration of 0.75% and diluting the resulting solution with 50 volumes of water. Using mixed solution and otherwise following the procedure of Example 26, an EVOH composition containing 0.028 part (calculated as boron) of boric acid (B) and 0.008 part (calculated as phosphate radical) of sodium dihydrogen phosphate (E) per 100 parts of EVOH (A) was obtained and this was evaluated in the same manner.

Example 30

Proceeding in the same manner as in Example 26 except that a mixture of an EVOH species ($A_1$) with an ethylene content of 30 mole percent, a saponification degree of 99.5 mole percent and a MI of 20 g/10 min and another EVOH species ($A_2$) with an ethylene content of 42 mole percent, a saponification degree of 99.6 mole percent and a MI of 15 g/10 min (mixing ratio $A_1/A_2$ 70/30 by weight) was used as EVOH (A), an EVOH composition containing 0.015 part (calculated as boron) of boric acid (B) and 0.005 part (calculated as phosphate radical) of calcium dihydrogen phosphate (E) per 100 parts of EVOH (A) was obtained and this was evaluated in the same manner.

Example 31

Proceeding in the same manner as in Example 26 except that a mixture of an EVOH species ($A_1$) with an ethylene content of 30 mole percent, a saponification degree of 99.5 mole percent and a MI of 20 g/10 min and another EVOH species ($A_2$) with an ethylene content of 47 mole percent, a saponification degree of 97 mole percent and a MI of 35 g/10 min (mixing ratio $A_1/A_2$=80/20 by weight) was used as EVOH (A), an EVOH composition containing 0.015 part (calculated as boron) of boric acid (B) and 0.005 part (calculated as phosphate radical) of calcium dihydrogen phosphate (E) per 106 parts of EVOH (A) was obtained and this was evaluated in the same manner.

Example 32

A mixed solution was prepared by charging and dissolving calcium dihydrogen phosphate (E) in a 0.1% aqueous solution of boric acid (B) to a concentration of 0.2%.

Then, the above mixed solution was incorporated in a post-saponification water/methanol solution of EVOH (A) with an ethylene content of 40 mole percent, a saponification degree of 99 mole percent and a MI of 6 g/10 min and the resulting mixture was made up into a porous precipitate (pellets), which was then washed with water and dried under the same conditions as in Example 1, to give an EVOH composition containing 0.02 part (calculated as boron) of boric acid (B) and 0.022 part (calculated as phosphate radical) of calcium dihydrogen phosphate (E) per 100 parts of EVOH (A). This composition was evaluated in the same manner.

Example 33

Magnesium dihydrogen phosphate (E) was dissolved in a 10% aqueous solution of boric acid (B) to a concentration of 1.5% and the solution was further diluted with 50 volumes of water to finally give a mixed solution containing 0.2% boric acid (B) and 0.03% magnesium dihydrogen phosphate (E).

Then, the above mixed solution was incorporated in a post-saponification water/methanol solution of EVOH (A) with an ethylene content of 35 mole percent, a saponification degree of 99.5 mole percent and a MI of 20 g/10 min and the resulting mixture was made up into a porous precipitate (pellets), which was then washed with water and dried under the same conditions as in Example 1, to give an EVOH composition containing 0.02 part (calculated as boron) of boric acid (B) and 0.007 part (calculated as phosphate radical) of magnesium dihydrogen phosphate (E) per 100 parts of EVOH (A). This composition was evaluated in the same manner.

Example 34

A mixed solution finally containing 0.04% phosphoric acid, 0.007% calcium dihydrogen phosphate (E) and 0.032% boric acid (B) was prepared by charging and dissolving calcium dihydrogen phosphate (E) and boric acid (B) in a 2% aqueous solution of phosphoric acid to respective concentrations of 0.35% and 1.6% and further diluting the resulting solution with 50 volumes of water. Using this mixed solution, the procedure of Example 26 was followed to give a resin composition containing 0.035 part (calculated as phosphate radical) of phosphoric acid, 0.005 part (calculated as phosphate radical) of calcium dihydrogen phosphate (E) and 0.015 part (calculated as boron) of boric acid (B) per 100 parts of EVOH (A). This composition was evaluated in the same manner.

Example 35

A mixed solution was prepared by dissolving potassium dihydrogen phosphate (E) and boric acid (B) in a 0.06% aqueous solution of phosphoric acid to respective concentrations of 0.057% and 0.05%. Using this mixed solution and otherwise following the procedure of Example 27, an EVOH composition containing 0.05 part (calculated as phosphate radical) of phosphoric acid, 0.02 part (calculated as phosphate radical) of potassium dihydrogen phosphate (E) and 0.02 part (calculated as boron) of boric acid (B) per 100 parts of EVOH (A) was obtained and this was evaluated in the same manner.

Example 36

A mixed solution was prepared by dissolving magnesium dihydrogen phosphate (E) and boric acid (B) in a 1% aqueous solution of phosphoric acid to respective concentrations of 0.92% and 0.80% and then diluting the resulting solution 50-fold with water. Using this mixed solution and otherwise following the procedure of Example 26, an EVOH composition containing 0.018 part (calculated as phosphate radical) of phosphoric acid, 0.018 part (calculated as phosphate radical) of magnesium dihydrogen phosphate (E) and 0.008 part (calculated as boron) of boric acid (B) per 100 parts of EVOH (A) was obtained and this was evaluated in the same manner.

Example 37

A mixed solution was prepared by dissolving sodium dihydrogen phosphate (E) and boric acid (B) in a 3% aqueous solution of phosphoric acid to respective concentrations of 0.75% and 0.5% and then diluting the resulting solution 50-fold with water. Using this mixed solution and otherwise following the procedure of Example 26, an EVOH composition containing 0.05 part (calculated as phosphate radical) of phosphoric acid, 0.008 part (calculated as phosphate radical) of sodium dihydrogen phosphate (E) and 0.005 part (calculated as boron) of boric acid (B) per 100 parts of EVOH (A) was obtained and this was evaluated in the same manner.

Example 38

The procedure of Example 34 was followed in the same manner except that a mixture of an EVOH species ($A_1$) with an ethylene content of 30 mole percent, a saponification degree of 99.5 mole percent and a MI of 20 g/10 min and another EVOH species (A₂) with an ethylene content of 42 mole percent, a saponification degree of 99.6 mole percent and a MI of 15 g/10 min (210° C., load 2160 g) (mixing ratio A₁/A₂=70/30 by weight) was used as EVOH (A), to give an EVOH composition containing 0.035 part (calculated as phosphate radical) of phosphoric acid, 0.005 part (calculated as phosphate radical) of calcium dihydrogen phosphate (E) and 0.015 part (calculated as boron) of boric acid (B) per 100 parts of EVOH (A). This composition was evaluated in the same manner.

Example 39

The procedure of Example 34 was followed in the same manner except that a mixture of an EVOH species (A₁) with an ethylene content of 30 mole percent, a saponification degree of 99.5 mole percent and a MI of 20 g/10 min and another EVOH species (A₂) with an ethylene content of 47 mole percent, a saponification degree of 97 mole percent and a MI of 35 g/10 min (mixing ratio A₁/A₂=80/20 by weight) was used as EVOH (A), to give an EVOH composition containing 0.035 part (calculated as phosphate radical) of phosphoric acid, 0.005 part (calculated as phosphate radical) of calcium dihydrogen phosphate (E) and 0.015 part (calculated as boron) of boric acid (B) per 100 parts of EVOH (A)p. This composition was evaluated in the same manner.

Example 40

A mixed solution was prepared by dissolving calcium dihydrogen phosphate (E) and boric acid (B) in a 0.2% aqueous solution of phosphoric acid to respective concentrations of 0.2% and 0.2%. Using this mixed solution and otherwise following the procedure of Example 32, an EVOH composition containing 0.03 part (calculated as phosphate radical) of phosphoric acid, 0.022 part (calculated as phosphate radical) of calcium dihydrogen phosphate (E) and 0.02 part (calculated as boron) of boric acid (B) per 100 parts of EVOH (A) was obtained. This composition was evaluated in the same manner.

Example 41

A mixed solution finally containing 0.1% phosphoric acid, 0.03% calcium dihydrogen phosphate (E) and 0.2% boric acid (B) was prepared by charging and dissolving calcium dihydrogen phosphate (E) and boric acid (B) in a 2.5% aqueous solution of phosphoric acid to respective concentrations of 0.75% and 5% and further diluting the resulting solution with 25 volumes of water. Using this mixed solution and otherwise following the procedure of Example 33, an EVOH composition containing 0.015 part (calculated as phosphate radical) of phosphoric acid, 0.007 part (calculated as phosphate radical) of magnesium dihydrogen phosphate (E) and 0.02 part (calculated as boron) of boric acid (B) per 100 parts of EVOH (A) was obtained. This composition was evaluated in the same manner.

The results of evaluation of the compositions obtained in Examples 26 to 41 are summarized in Table 3.

TABLE 3

| | Fish eyes | Long-run moldability |
|---|---|---|
| Example 26 | ◎ | ○ |
| Example 27 | ○ | ○ |
| Example 28 | ◎ | ○ |
| Example 29 | ◎ | ○ |
| Example 30 | ◎ | ○ |
| Example 31 | ◎ | ○ |
| Example 32 | ○ | ○ |
| Example 33 | ◎ | ○ |
| Example 34 | ◎ | ○ |
| Example 35 | ○ | ○ |
| Example 36 | ◎ | ○ |
| Example 37 | ◎ | ○ |
| Example 38 | ◎ | ○ |
| Example 39 | ◎ | ○ |
| Example 40 | ○ | ○ |
| Example 41 | ◎ | ○ |

Industrial Utilizability

The resin composition of the present invention contains, in EVOH (A), a boron compound (B) as an essential component, acetic acid (C) as an optional component, and at least one compound selected as an essential component from among an acetic acid salt (D) and a phosphoric acid compound (E) in respectively specified amounts, and the effects of the respective additive components can be maximized by the elaborate preparation and drying steps. As a result, the resin composition of the present invention is excellent in long-run feature in the step of melt molding and gives moldings having only a small number of minute fish eyes and/or striae with a diameter smaller than 0.1 mm as well as laminates having good interlaminar adhesion.

Moldings, laminates and stretched articles obtained from the resin composition of the present invention are excellent in characteristics and quality, hence are very useful as films, sheets, tubes, bags, containers and the like for packaging foodstuffs, drugs, agrochemicals and industrial chemicals.

What is claimed is:

1. A resin composition which comprises (A) a saponified ethylene vinyl acetate copolymer (referred to as EVOH for short) with an ethylene content of 20 to 60 mole percent and a saponification degree of not less than 90 mole present, and contains therein (B) a boron compound selected from boric acid and metal salts thereof, as an essential component, (C) acetic acid as an optional component, and at least one compound selected from among (D) an acetic acid salt and (E) a phosphoric acid compound as an essential component, the contents of the respective additive components per 100 parts by weight of EVOH (A) being as follows:

boron compound (B): 0.001 to 1 part by weight on the boron basis;
 acetic acid (C): 0 to 0.05 part by weight;
 acetic acid salt (D): 0.001 to 0.05 part by weight on the metal basis; and
 phosphoric acid compound (E): 0.0005 to 0.05 part by weight on the phosphate radical basis.

2. A process for producing a resin composition comprising (A) a saponified ethylene-vinyl acetate copolymer (referred to as EVOH for short) with an ethylene content of 20 to 60 mole percent and a saponification degree of not less than 90 mole present, and contains therein (B) a boron compound selected from boric acid and-metal salts-thereof as an essential component, (C) acetic acid as an optional component, and at least one compound selected from among (D) an acetic acid salt and (E) a phosphoric acid compound as an essential component, the contents of the respective additive components per 100 parts by weight of EVOH (A) being as follows:

boron compound (B): 0.001 to 1 part by weight on the boron basis;

acetic acid (C): 0 to 0.05 part by weight;

acetic acid salt (D): 0.001 to 0.05 part by weight on the metal basis; and phosphoric acid compound (E): 0.0005 to 0.05 part by weight on the phosphate radical basis, which process comprises bring EVOH (A) with a water content of 20 to 80% by weight into contact with an aqueous solution containing the boron compound (B) as an essential component, acetic acid (C) as an optional component, and at least one compound selected from among the acetic acid salt (D) and phosphoric acid compound (E) as an essential component.

3. A process for producing a resin composition as claimed in claim 2, wherein EVOH (A) with a water content of 20 to 80% by weight is brought into contact with an aqueous solution containing the boron compound (B) as an essential component, acetic acid (C) as an optional component, and at least one compound selected from among the acetic acid salt (D) and phosphoric acid compound (E) as an essential component and the proportions of the respective additive components per 100 parts by weight of the sum total of the water contained in the aqueous solution and the water contained in EVOH (A) are selected as follows:

boron compound (B): 0.001 to 0.5 part by weight;

acetic acid (C): 0.005 to 1 part by weight;

acetic acid salt (D): 0.001 to 0.5 part by weight;

phosphoric acid compound (E): 0.0001 to 0.5 part by weight.

4. A process for producing a resin composition as claimed in claim 2 or 3, wherein the EVOH (A) after having been brought into contact with the aqueous solution containing boron compound (B) as essential component, acetic acid (C) as optional component, and at least one compound selected from among acetic acid salt (D) and phosphoric acid compound (E) as essential component is subjected to drying in a fluidized state preceded or followed by drying in a stationary state.

5. A process for producing a resin composition as claimed in claim 4, wherein the drying in a fluidized state is followed by drying in a stationary state, the difference between the water content in the resin composition before fluidized state drying treatment and that after said treatment being not less than 5% by weight.

6. A laminate which comprises a layer composed of a resin composition comprising (A) a saponified ethylene-vinyl acetate copolymer (referred to as EVOH for short) with an ethylene content of 20 to 60 mole percent and a saponification degree of not less than 90 mole percent and containing therein (B) a boron compound selected from boric acid and metal salts thereof as an essential component, (C) acetic acid as an optional component, and at least one compound selected from among (D) an acetic acid salt and (E) a phosphoric acid compound as an essential component, the contents of the respective additive components per 100 parts by weight of EVOH (A) being as follows:

boron compound (B): 0.001 to 1 part by weight on the boron basis;

acetic acid (C): 0 to 0.05 part by weight;

acetic acid salt (D): 0.001 to 0.05 part by weight on the metal basis; and phosphoric acid compound (E): 0.0005 to 0.05 part by weight on the phosphate radical basis, as provided on at least one side thereof with a thermoplastic resin layer.

* * * * *